United States Patent

[11] 3,579,991

| [72] | Inventor | Harold E. Nelson, Jr.<br>Chula Vista, Calif. |
|---|---|---|
| [21] | Appl. No. | 1,510 |
| [22] | Filed | Jan. 8, 1970 |
| [45] | Patented | May 25, 1971 |
| [73] | Assignee | Rohr Corporation<br>Chula Vista, Calif. |

[54] THRUST REVERSING APPARATUS FOR JET-PROPELLED AIRCRAFT
4 Claims, 10 Drawing Figs.

[52] U.S. Cl. ................................................. 60/232, 60/229
[51] Int. Cl. ................................................. F02k 1/24
[50] Field of Search ................................................. 60/232, 231, 230, 229, 228, 226, 233, 242; 239/265.29; 244/52

[56] References Cited
UNITED STATES PATENTS

| 2,943,443 | 7/1960 | Voymas | 60/230 |
| 3,020,712 | 2/1962 | Dolliver | 239/265.29UX |
| 3,164,956 | 1/1965 | Colebrook | 239/265.29X |
| 3,531,049 | 9/1970 | Hom | 60/229X |

Primary Examiner—Clarence R. Gordan
Attorney—George E. Pearson

ABSTRACT: Thrust reversing doors are mounted on an aircraft jet engine housing by means of links each pivoted at one end to the housing and pivoted at its other end to the aft portion of one of the two side edges of a respective one of the doors. Means are provided to limit the rotation of the links relative to the housing and the rotation of the doors relative to the links. Drive links are connected to the doors and to actuators which are mounted on the housing and which can be operated to thereby move the doors between stowed and deployed positions relative to the housing.

PATENTED MAY 25 1971

INVENTOR.
HAROLD E. NELSON, JR.
BY
Edwin D. Grant
ATTORNEY

INVENTOR.
HAROLD E. NELSON, JR.
BY Edwin D. Grant
ATTORNEY

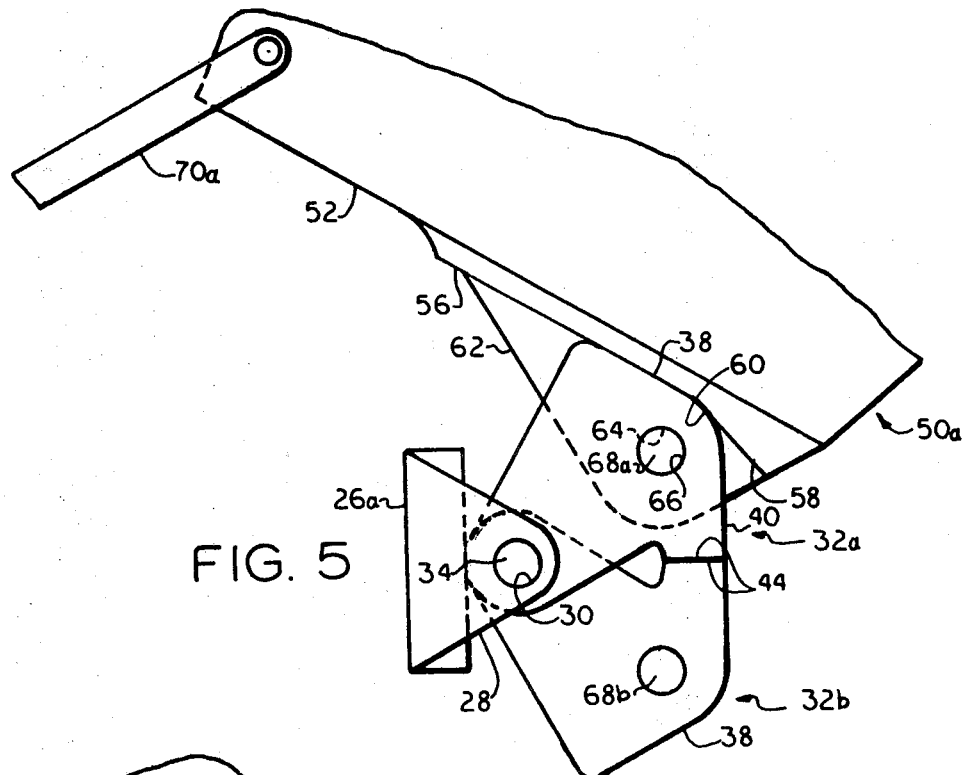
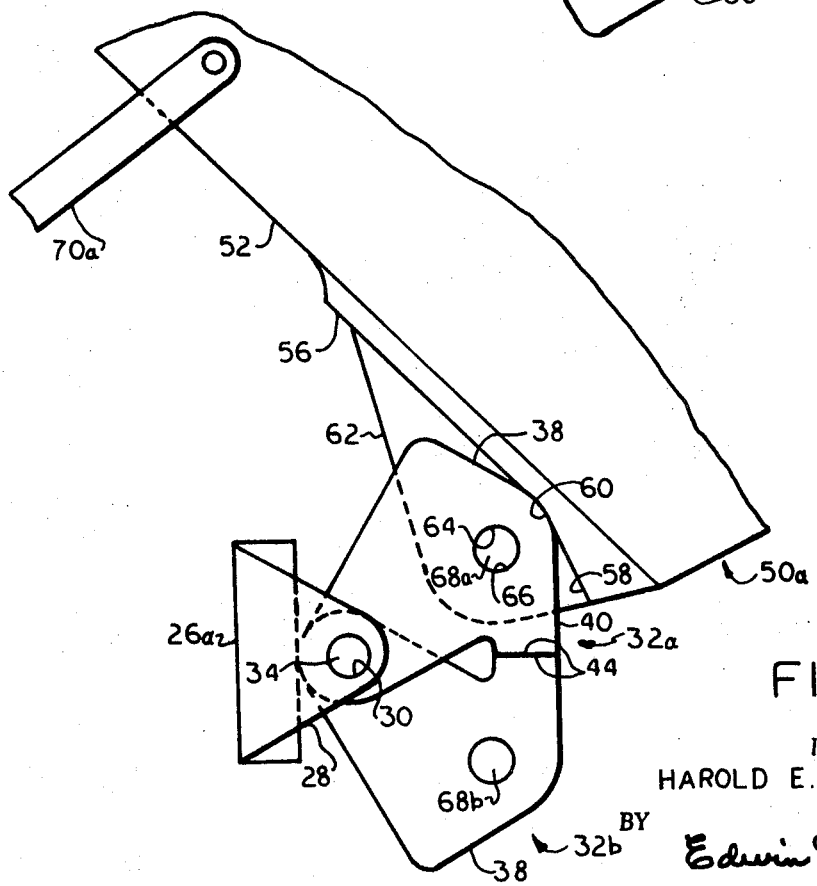

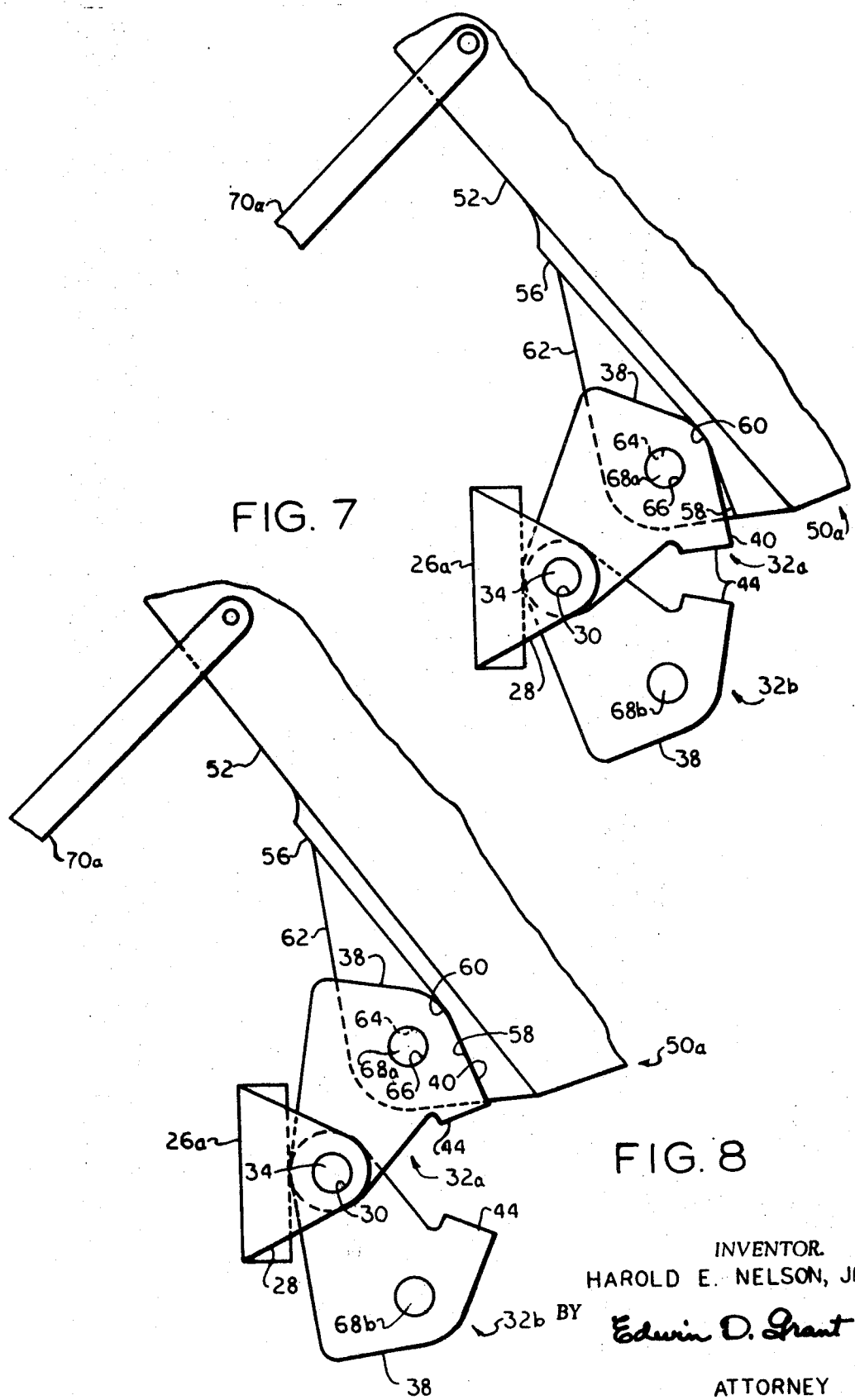

INVENTOR.
HAROLD E. NELSON, JR.

THRUST REVERSING APPARATUS FOR JET-PROPELLED AIRCRAFT

SUMMARY OF THE INVENTION

This invention relates to jet-propelled aircraft and more particularly to thrust reversing apparatus for such aircraft.

The engine housings of many jet-propelled aircraft are equipped with arcuate thrust reversing doors which are mounted on said housings so that associated pairs thereof can be either stowed alongside a housing to close openings therein or deployed to a position wherein the doors deflect exhaust gas through the openings and thereby reverse the thrust of jet-streams of the aircraft. Often a thrust reversing door of this type is mounted on an engine housing by means of four links two of which have one end thereof pivoted in longitudinally spaced relation to one side edge of the door and the other two of which have one end thereof pivoted in longitudinally spaced relation to the other side edge of the door, the other ends of the links being pivoted to the housing and drive means being connected to a pair of the links to swing the door between its stowed and deployed positions. In conventional linkage arrangements of the type described, stresses placed on the different links, as a result of the impingement of exhaust gas and atmospheric air on the door connected thereto, can vary considerably as the door is being moved from its stowed to its deployed position and vice versa, and it is thus necessary to use links having a size greater than that which would be required if the links were placed under a more uniform stress throughout their movement. However, in thrust reversing apparatus constructed in accordance with the principles of this invention, links which connect a thrust reversing door to a jet engine housing are arranged so that the stresses placed thereon tend to be equalized under different force conditions which may exist as the door is being deployed or stowed. Thus, the present invention enables links of minimal size to be used in the attachment of thrust reversing doors to a jet engine housing. Furthermore, forces exerted on thrust reversing doors arranged in accordance with the present invention are more evenly distributed upon the wall of the associated jet engine housing, thereby providing advantages from the standpoint of the structural design of the latter.

More particularly, in apparatus in accordance with this invention each of a pair of arcuate thrust reversing doors is attached to an aircraft jet engine housing by means of four links, two of which are mounted on the wall of the housing for rotation about a first axis disposed transverse to the longitudinal axis of the housing. The last-mentioned pair of links (which for identification will hereinafter be referred to as the support links) project laterally and are spaced apart on, said first axis and their free ends (i.e., the ends are not connected to the wall of the housing) are respectively pivoted to the aft portion of the side edges of the associated door. Thus each door is rotatable about the free ends of the support links to which it is connected and, because these links can be rotated about the first axis in forward and aft direction, the doors can also be swung between a stowed position wherein they close openings in the wall of the housing and their side edges are disposed axially of the latter, and a deployed position wherein they are disposed downstream from their stowed position and their aft ends abut each other at the center portion of the jet stream issuing from the jet engine contained in the housing. Means on the support links and on the door are arranged to limit the rotation of the latter relative to the former, and means are also provided to limit the rotation of the support links relative to the housing. Two of the four links connected to each door are associated with drive means, such as pressure actuated rams, which can be operated to move the door between its stowed and deployed positions. As will be more apparent hereinafter, the above-described arrangement is such that the movement of a door between its stowed and deployed positions is not restricted to a single path but instead can occur within a limited zone, thus allowing the door to assume the position during its movement which most evenly distributes the load thereon to the four links which attach the door to the housing. The arrangement of the disclosed apparatus also permits one door to follow a first path as it is being deployed or stowed, and the other door to follow a second different path as it is being simultaneously deployed and stowed with said one door.

DESCRIPTION OF THE DRAWINGS

In the accompanying drawings:

FIGS. 4 through 9 are fragmentary side elevations of a door and the links connected to one side of the latter the drawings illustrating in sequence the positions assumed by components as the doors are moved between their stowed and fully deployed positions.

Throughout the following specification and the drawings, the same numbers designate the same parts.

DETAILED DESCRIPTION

Figure 1:
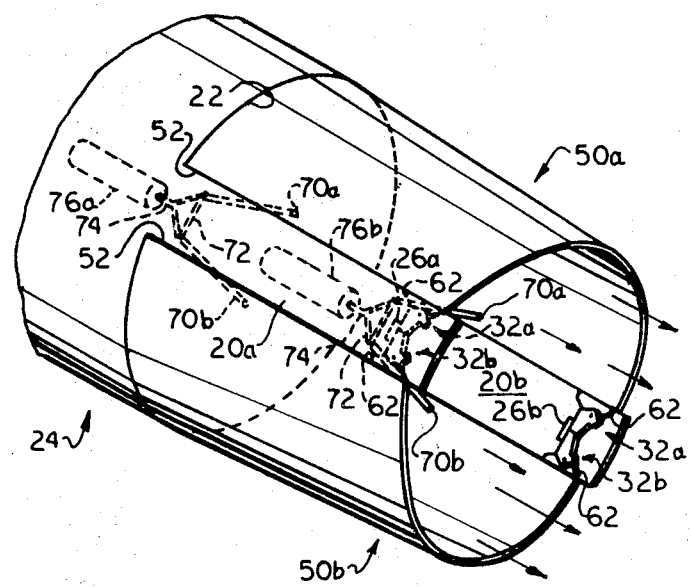
FIG. 1 is a pictorial representation of the aft end of an aircraft jet engine housing which is equipped with thrust reversing apparatus in accordance with the present invention, illustrating thrust reversing doors of said apparatus in their stowed position.
Figure 2:
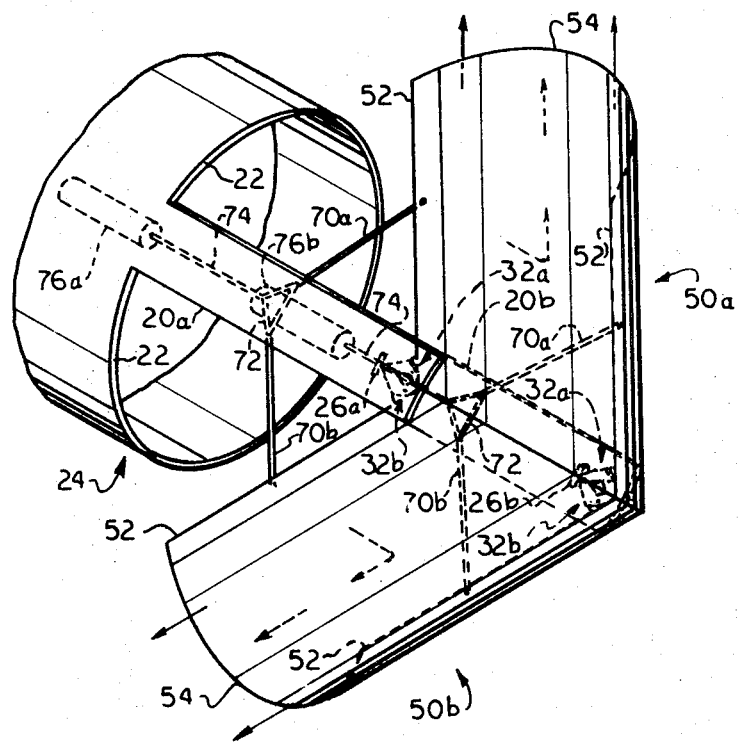
FIG. 2 is another pictorial view of the same housing, illustrating the aforesaid doors in their fully deployed position.
Figure 3:
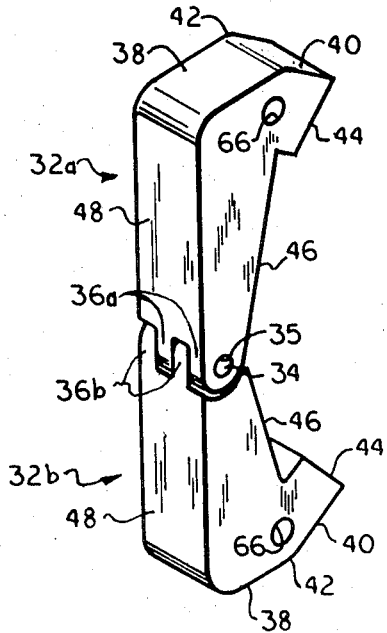
FIG. 3 is an enlarged, pictorial detail view of a typical pair of four support links which connect the aft ends of the doors to the housing.
Figure 9:
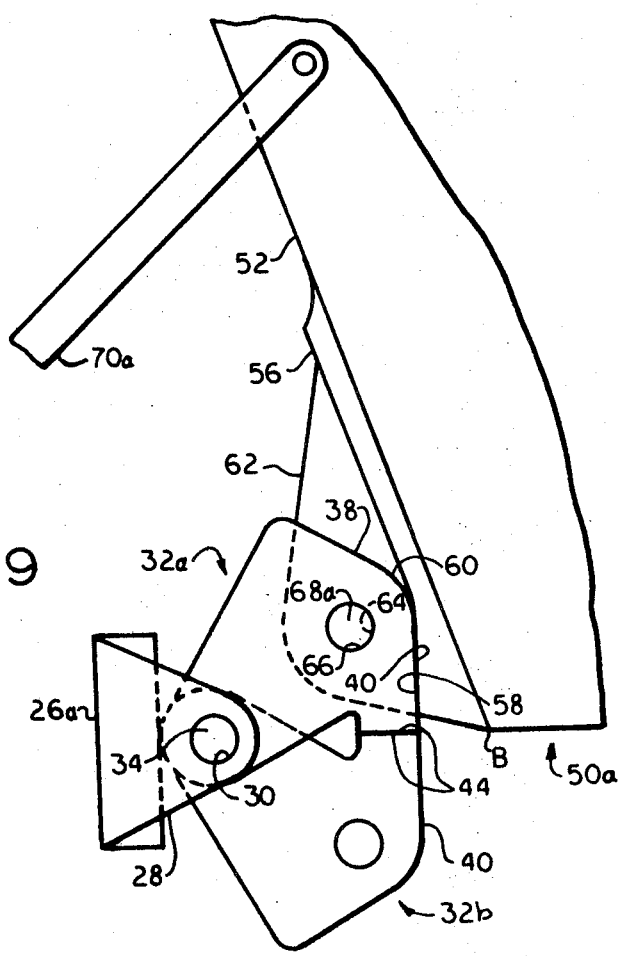

In one embodiment of the invention which is illustrated in pictorial view in FIGS. 1 and 2, a pair of elongate, diametrically opposed sidewalls 20a,20b project rearwardly from the aft edge 22 of a tubular housing, generally designated by the number 24. Fixedly positioned on the inner surface of each wall 20a,20b adjacent the aft end thereof is a mounting block 26a,26b, typical one of which is shown in side elevational view in FIGS. 4 through 9. Each mounting block extends laterally from the wall to which it attached and includes a rearwardly projecting arm 28 having a hole 30 formed in its free end, the axes of the holes 30 in the pair of mounting blocks being coincident and intersecting the longitudinal axis of the jet engine and thrust nozzle (not shown) which are enclosed within housing 24. A pair of support links, respectively generally designated 32a, 32b, are pivoted to each mounting block by means of a pin 34 engaged within hole 30 in arm 28 thereof and within holes 35 in parallel arms 36a, 36b (see FIG. 3) formed at one end of the support links. As illustrated in the last-mentioned drawing, the arms 36a, 36b of the associated pairs of support links are arranged so that the sides of the links are coplanar. It can also be seen in the same drawing that the free ends of the support links are formed with first and second planar edges 38, 40 which are joined by a curved edge 42, and that the downstream edges of the support links are formed with an offset portions 44, 46. Thus the pairs of support links on each sidewall 20a, 20b can rotate about a first axis disposed transverse to the longitudinal axis of housing 24, and between a first position wherein their forward edges 48 abut a respective one of the mounting blocks 26a, 26b (see FIG. 4) and a second position wherein the edge portions 44 of the associated pairs abut each other (see FIG. 9).

Pivoted to the free end of the support links are a pair of arcuate thrust reversing doors, generally designated by the numbers 50a, 50b. More particularly, the doors are shaped so that when they are in the stowed position which is illustrated in FIG. 1 their side edges 52 respectively abut the longitudinal edges of walls and their forward edges 54 (see FIG. 2) abut the aft edge 22 of housing 24. Thus the doors and walls 20a, 20b form a continuation of the housing when the doors are stowed. At the aft portion of each side edge of each door is a first planar surface 56 (see FIG. 4) which is parallel with said side edge, a second planar edge 58 which is aft of said first edge and which extends obliquely outward therefrom, and a curved surface 60 extending between said first and second surfaces. A lug 62 projects laterally from one side of the aforesaid planar surfaces on each of the side edges of the doors, this lug being formed with a hole 64 adjacent the curved surface 60 and one side thereof being disposed next to a side of a respective one of the support links 32a, 32b. Each support link has a hole 66 formed therein adjacent its curved edge 42, and a pin 68a, 68b extends through this hole and through hole 64 in the adjacent lug 62 so that one door is rotatable relative to two support links 32a respectively connected to side walls 20a, 20b and the other door is rotatable relative to two support links 32b also respectively connected to said sidewalls. Furthermore, the longitudinal axes of the two pins 68 which mount a door to the sidewalls are coincident with each other and parallel with the first axis about which the support links can rotate. When the doors are in the stowed position illustrated in FIG. 4, first edges 38 of the support links are engaged with first surfaces 56 on said doors; when the doors are in the fully deployed position illustrated in FIG. 9, second edges 40 of the support links are engaged with second surfaces 58 on said doors.

One end of each of two drive links 70a, 70b is pivotally connected to a triangular frame 72 which is fixedly mounted on the free end of the drive shaft 74 of a respective one of two actuators 76a, 76b fixedly attached to the inner surface of housing 24 adjacent the aft edge 22 thereof. The other end of each drive link 70a is pivotally connected to a respective one of the side edges 52 of upper door 50a adjacent the midpoint thereof, and the other end of each drive link 70b is likewise pivotally connected to a respective one of the side edges of lower door 50b adjacent the midpoint thereof. Actuators 76a, 76b can be simultaneously operated to move drive shafts 74 along their own longitudinal axes and between the retracted position illustrated in fig. 1 and the extended position illustrated in FIG. 2. Suitable guide means such as rails (not shown) are provided to prevent movement of frames 72 laterally of sidewalls 20a, 20b as they are translated longitudinally of the latter by the actuators.

OPERATION

Figure 4:
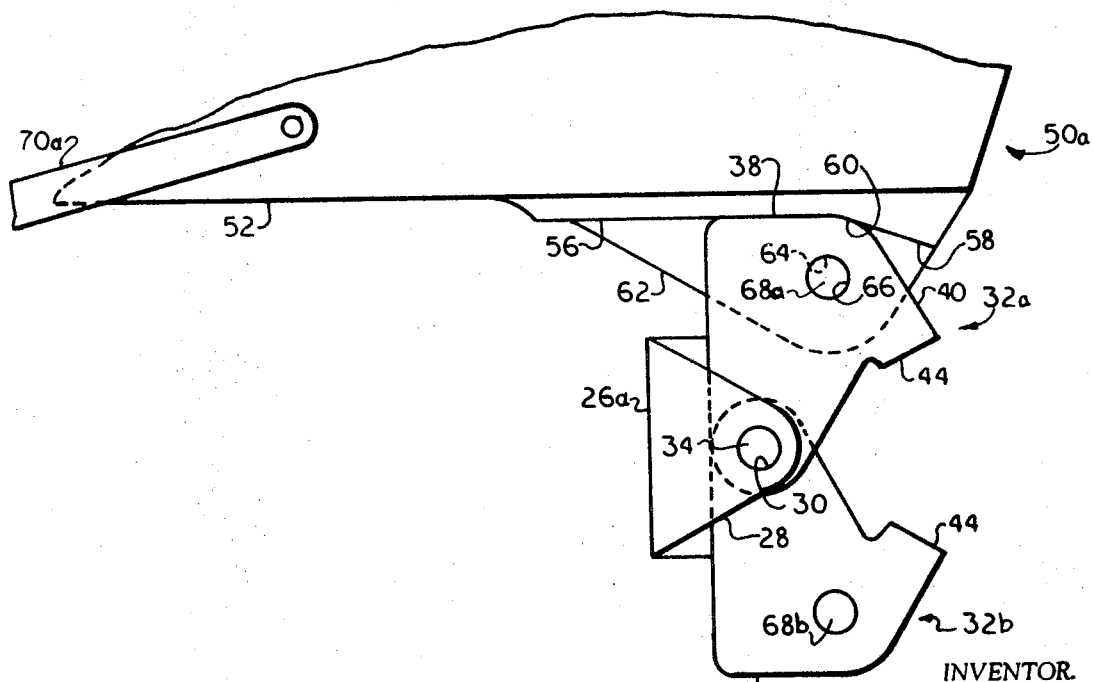

As represented by arrows in FIG. 1, exhaust gas of the jet engine within housing 24 flows through the tubular extension of said housing which is formed by sidewalls 20a, 20b and doors 50a, 50b when the latter are stowed as illustrated in FIG. 1. At this time the support links 32a, 32b mounted on each sidewall are disposed transverse to the longitudinal axis of the housing and their forward edges abut a respective one of the mounting blocks 26a, 26b, as illustrated in FIG. 4.

To deploy the doors to the position illustrated in FIG. 2, actuators 76a, 76b are simultaneously operated so as to move rearwardly drive shafts 74 and frames 72 connected thereto. Under normal operating conditions (i.e., when the center of pressure on each door is located at the point for which the components of the apparatus are designed to provide optimum performance), this rearward movement of frames 72 causes drive links 70a, 70b to swing door 50a and support links 32a as a single unit about the aforesaid first axis (i.e., the common axis of pins 34), and to swing door 50b and support links 32b as a single unit about the same axis. That is, first surfaces 56 of the doors remain in contact with first edges 38 of the support links during the initial movement of the doors outwardly and rearwardly. However, when edges 44 of the support links engage each other (see FIG. 5), rotation of the doors transfers to the axes of rotation between the doors and the support links and first surfaces 56 disengage from first edges 38 (see FIG. 6). When the longitudinal axes of drive links 70a become parallel with a plane which includes the longitudinal axes of pins 34 and pins 68b, the support links rotate about the longitudinal axes of pins 34 (i.e., said support links disengage from each other) while the doors continue to rotate about pins 68 and 68b respectively (see FIG. 7) until second surfaces 58 of said doors contact second edges 40 of said support links (see FIG. 8). Thereafter the doors and their respective support links pivot as units about pins 34 until edges 44 of said support links again abut each other, at which time the aft edges of the doors also abut each other (see FIG. 9). The positions which the doors and support links assume when first and second surfaces 56, 60 of the doors are respectively disengaged from first and second edges 38, 40 of the support links (as in FIG. 7) depend upon factors such as the velocity of the aircraft carrying the described thrust reversing apparatus, the thrust level of the engines of said aircraft, and the density of atmospheric air impinging upon the doors, all of which factors affect the magnitude and directions of forces exerted upon said doors. However, at all times when the first and second surfaces 56, 58 are disengaged from first and second edges 38, 40, the support links will assume the position relative to the mounting blocks which most nearly equalizes the stresses in said support links and in the drive links 70a, 70b.

The included angle between the aft edge and the side edges 52 of each door is obtuse. Hence the doors are inclined toward the forward end of housing 24 when in the fully deployed position, and exhaust gas which impinges upon the doors is thus deflected both outwardly and forwardly, as illustrated by arrows in FIG. 2. It will be obvious that the doors can be returned to their stowed position by operating actuators 76a, 76b to move drive shafts toward the forward end of housing 24, and that the operation of said actuators can be stopped by suitable limit switches when the doors reach either the deployed or stowed positions.

Figure 10:
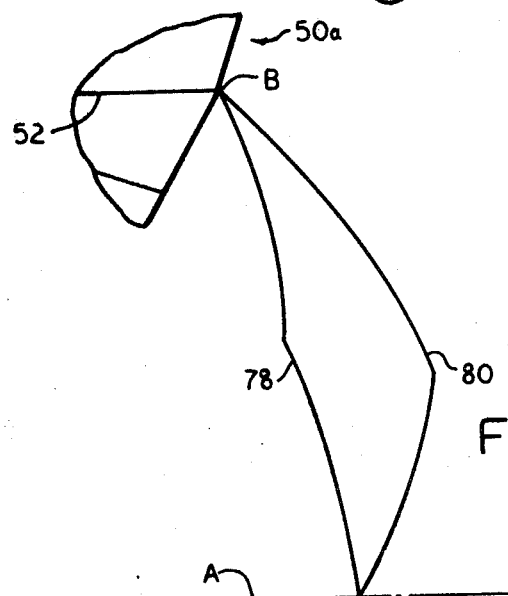
FIG. 10 is a drawing which illustrates the different paths which either of the doors may travel as it moves between the stowed and fully deployed positions.

As previously noted, the movements of the doors and support links which are illustrated in FIGS. 4 through 9 are those which occur under normal operating conditions for which the thrust reversing apparatus is designed. Under other operating conditions the movement of the doors, as they are being deployed, may differ from the sequence shown in FIGS. 4 through 9. For example, yaw of an aircraft provided with the described doors and links may place unequal air pressures upon the doors, in which situation the doors may at least temporarily assume different positions as they are being moved between the stowed and fully deployed configurations. It should also be pointed out that the forces on the doors may be such that when actuators 76a, 76b move frames 72 away from their most forward position, the initial movement of the doors will be that resulting from their rotation about the support links 32a, 32b while the latter remain in the first position thereof which is illustrated in FIG. 1. Furthermore, the first and second surfaces 56, 58 on the doors may not engage the first and second edges 38, 40 of the support links, respectively, as the latter are rotated between their first position wherein they abut mounting blocks 26a, 26b and their second position wherein their edges 44 abut each other (although first surfaces 56 will always abut first edges 38 when the doors are in the stowed position, and second surfaces 58 will always abut second edges 40 when the doors are in the fully deployed position). The limits of movement of the doors can be more clearly understood by examination of FIG. 10, wherein the letter A identifies the plane at which the aft edges of doors 50a and 50b abut when fully deployed, the letter B identifies the lower rear corner of the upper door 50a, and the lines designated 78, 80, respectively delineate the forwardmost and rearmost paths which said corner may follow as the door is moved between its stowed and fully deployed positions. Corner B may also follow other paths which lie in the area between lines 78 and 80, and the path followed will always be that which most nearly equalizes the stresses placed upon links 50a, 50b, 70a and 70b.

Although this invention has been described with reference to a particular embodiment of same, it should not be limited thereto for various changes and modifications could be made by one having ordinary skill in the art without departing from the spirit and scope of this invention as defined in the following claims.

What is claimed as new and useful and desired to be secured by U. S. Letters Patent is:

1. In combination with an aircraft jet engine housing, thrust reversing apparatus comprising a pair of support links mounted on said housing for rotation about a first axis disposed transverse to the longitudinal axis of the latter, said support links projecting laterally from, and being spaced apart on, said first axis and being rotatable thereabout between a first position wherein they are disposed transverse to the longitudinal axis of said housing and a second position wherein their free ends are downstream from said first axis, means operatively associated with said housing and said support links for limiting rotation of the latter about said first axis to the angle between said first and second positions thereof, an arcuate thrust reversing door the aft portions of the side edges of which are respectively pivoted to the free ends of said support links so that said door is rotatable about a second axis substantially parallel to said first axis, and between first and second angular positions relative to said support links, means operatively associated with said support links and said door for limiting rotation of the latter relative to the former to the angle between said first and second angular positions thereof, and means operatively associated with said housing and said door for moving the latter between stowed and deployed positions wherein the side edges thereof respectively extend axial of, and lateral to, the longitudinal axis of said housing, said support links being in said first position thereof when said door is stowed and in said second position thereof when said door is deployed.

2. Apparatus as defined in claim 1 wherein each of said support links is formed at its free end with first and second planar edges disposed on opposite sides of, and oblique to, a plane including said first and second axes, and wherein said means for limiting the rotation of said door relative to said support links comprises a first planar surface extending along each side edge of said door and a second planar surface aft of said first surface and extending obliquely outward therefrom, said first surfaces respectively contacting said first edges when said door is rotated to its first angular position relative to said support links and said second surfaces respectively contacting said second edges when said door is rotated to its second angular position relative to said support links.

3. In combination with a tubular aircraft jet engine housing, thrust reversing apparatus comprising four support links mounted on said housing for rotation about a first axis disposed transverse to the longitudinal axis of the latter, said support links projecting laterally from, and being arranged in associated pairs respectively spaced apart on, said first axis and being rotatable thereabout between a first position wherein they are disposed transverse to the longitudinal axis of said housing and a second position wherein their free ends are downstream from said first axis, means operatively associated with said housing and said support links for limiting rotation of the latter about said first axis to the angle between said first and second positions thereof, a pair of arcuate thrust reversing doors the aft portions of the side edges of which are respectively pivoted to the free ends of said support links so that said doors lie on opposite sides of the longitudinal axis of said housing and so that each of said doors is rotatable about an axis parallel to said first axis and located at the free ends of two of said support links on opposite sides of said housing, each of said support links being formed at its free end with first and second linear edges disposed on opposite sides of, and oblique to, a respective one of the two planes including said first axis and the axes of rotation of said doors relative to said support links, each of said doors comprising a first planar surface extending along each side edge thereof and a second planar surface aft of said first surface and extending obliquely outward therefrom, said first surfaces respectively contacting said first edges when said doors are rotated to a first angular position relative to the support links connected thereto and said second surfaces respectively contacting said second edges when said doors are rotated to a second angular position relative to said support links thereby limiting rotation of said doors about the free ends of said support links to the angle between said first and second angular positions, and means operatively associated with said housing and said doors for moving the latter between stowed and fully deployed positions wherein the side edges thereof respectively extend axial of, and lateral to, the longitudinal axis of said housing, said links being in said first position thereof when said doors are stowed and in said second position thereof when said doors are fully deployed.

4. Apparatus as defined in claim 3 wherein said means for limiting rotation of said support links to the angle between said first and second positions thereof comprise a third planar edge on each of said support links, said third edges of the associated pairs of said support links respectively contacting one another when said support links are rotated to said second position, and stop means which are mounted on said housing and which respectively contact said links when they are rotated to said first position.